United States Patent Office 3,180,568
Patented Apr. 27, 1965

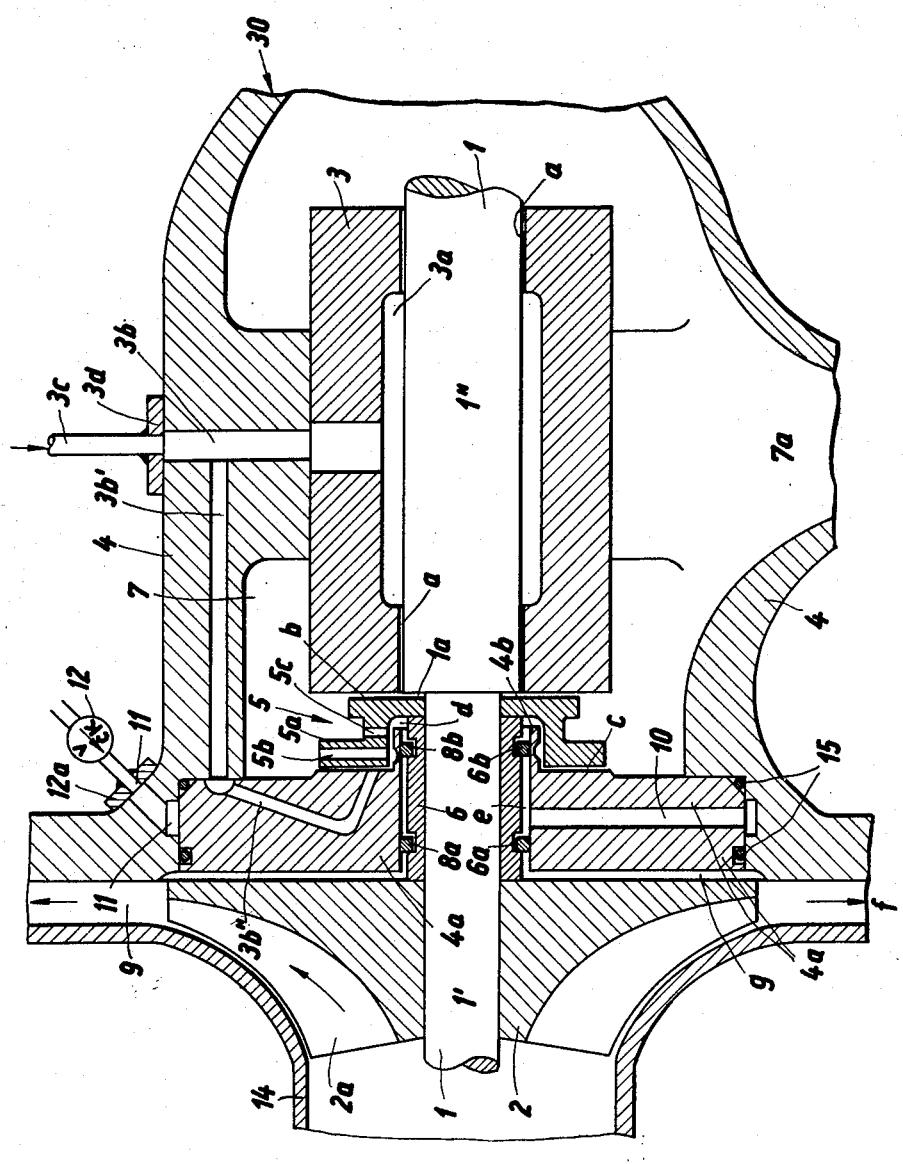

3,180,568
TURBINE SUPERCHARGERS
Walter Oettle, Goppingen, Germany, assignor to Geratebau Eberspacher OHG, Esslingen (Neckar), Germany
Filed July 1, 1963, Ser. No. 291,953
Claims priority, application Germany, July 14, 1962,
G 35,475
4 Claims. (Cl. 230—207)

This invention relates in general to turbine supercharger construction, and in particular to a new and useful turbine supercharger lubricating system which includes means for preventing the lubricant from being sucked away from the bearing parts when there is an underpressure in the turbine discharge.

The present invention is particularly applicable to constructions of turbine supercharger for use in connection with the supplying of combustion air to internal combustion engines. The operation of these engines is such that undesired negative pressures or vacuums appear, particularly in the discharge of the turbine, particularly when sudden accelerations of the engine take place. In such instances the exhaust gas turbine does not have enough time to utilize the greater pressure gradient which will exist. Turbine supercharges which are utilized for supplying combustion air to the intake of the engine will thus regularly be subjected to conditions in which the lubricating oil is sucked away from the operating rotative parts and drawn through the turbine discharge to the intake of the engine. Naturally, when this occurs there is a danger that the parts will rapidly wear and deteriorate.

In accordance with the present invention there is provided a turbine supercharger which includes a casing with a portion located adjacent the discharge of the turbine impeller which carries an air passage member or disc which is sealed in an axial direction by means of sealing rings and which includes a passage disposed centrally along a bushing located between the rotative parts and the turbine discharge. The passage communicates with the atmosphere through a one-way or check valve which permits air from the atmosphere to be drawn in whenever vacuum pressure is produced in the turbine discharge and there is a tendency for the lubricant adjacent the bearing passage member and in the critical areas between the rotating parts and the bearing bushing to be drawn into the discharge of the supercharger.

According to the invention there is provided a casing which surrounds a bearing bushing and a sleeve or spacer bushing with a passage member or disc supported between the sleeve bushing and the casing and defining lubricant collecting space between it and the surrounding spacing and the turbine draft supporting bearing. The bearing passage member advantageously includes a radial passage which communicates with a passage in the casing which connects to atmosphere whenever the pressure in the vicinity of the passage falls to a negative value. By the provision of the passage member with the passage which connects to atmosphere, the pressure in the turbine discharge which tends to draw away the lubrication will be equalized. The passage member advantageously is carried on a sleeve bushing, and the space between the passage member and the turbine supercharger discharge is sealed off by means of piston rings at each end.

Accordingly, it is an object of this invention to provide an improved turbine supercharger construction.

A further object of the invention is to provide a turbine supercharger which includes a casing defining an air chamber in which is rotatable a turbine impeller for discharging combustion air to the intake of an internal combustion engine, and wherein the impeller is mounted for rotation on a shaft rotatably supported on a bearing bushing having lubrication for sealing the rotating parts against end thrust and radial thrust in respect to the shaft, and including a bearing passage member sealed between a sleeve bushing and the casing and located between the bearing bushing and the impeller which is provided with an equalizing passage adapted to communicate with atmosphere, whenever the discharge of the supercharger produces a negative pressure in the vicinity.

A further object of the invention is to provide an improved means for preventing the withdrawal of lubricant from the rotating bearing supports of a turbine blower wheel, when the operating pressure conditions produce a vacuum.

A further object of the invention is to provide a turbine supercharger construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The only figure of the drawing is a longitudinal sectional view of a portion of a gas turbine supercharger constructed in accordance with the invention.

Referring to the drawing in particular, the invention embodied therein comprises a turbine supercharger generally designated 30 which includes a main shaft 1 having a portion 1' of reduced diameter, and an enlarged portion 1". An impeller or blower rotor 2 is affixed to the shaft 1 for rotation therewith and it includes an axial intake 2a and a radial discharge for discharging into an annular space 9.

The shaft 1 is rotatably mounted in a bearing bushing 3 which is secured within a casing or housing 4. Oil is supplied to an annular space 3a defined between the bushing 3 and the shaft 1 through a passage or oil supply line 3c via the bore 3b in the housing 4. The supply line 3c is secured to the casing by means of a securing flange which is connected to the casing 4.

In journal bearings of this type prelubrication is always necessary so that an oil film will form between the shaft 1 and the bushing 3 to carry the load and separate the rotating parts completely from each other. In accordance with the invention a guide plate or spur disc generally designated 5 is provided between the bushing 3 and a passage member or equalizing disc 4. The spur disc 5 is centered on the shaft 1 at a location adjacent the large diameter portion 1" and abuts against the shaft shoulder 1 under the influence of a bushing sleeve element 6 which is drawn on the small diameter portion 1'. In the inventive construction the spur disc 5 acts as a pressure bearing but at the same time also as a labyrinth seal of the bearing area against the passage member 4a.

The spur disc 5 is provided with a disc-shaped extension 5a which overlies an axial projection or extension 4b of the passage member 4a. The spur disc 5 forms a labyrinth-like sealing gap d with the extension 4b.

When the shaft 1 is rotated, the oil which is forced into the oil feed chamber 3a is pulled into the bearing wedge 1a formed between the spur disc 5 and the end of the large diameter portion 1" after the engine has come up to a sufficient speed. Oil pressure is also produced in gaps a and b formed between the bushing 3 and the shaft portion 1" and the end of the bushing and the spur disc 5, respectively. It is necessary that these oil layers form at each of the locations 1a and b for supporting the parts during their rotation. Oil which is circulated through these gaps then flows into an oil collecting chamber 7 formed between the bushing 3, the casing 4 and the passage member 4a. The passage 7 opens in a downward direction to a discharge 7a.

The spur disc member 5 is provided with radial oil centrifuging holes 5b and 5c through which oil passing from the labyrinth gap d is returned to the oil discharge chamber 7. Oil is supplied to the gap c formed between the spur disc and the oil passage member 4a through the branch bores 3b' and 3b". From all of the lubricating areas the oil runs into the oil collecting space 7 and is discharged through the opening 7a. The radial centrifuging bores 5b and 5c in the disc 5 ensure the return of the oil which has passed into the labyrinth gap e and the space d between the bushing 6 and the oil passage member 4a.

In some instances, such as when the engine which is being operated with the turbine supercharger is rapidly accelerated, penetration of oil into the space 9 and the gap g between the impeller 2 and the oil passage member 4a will occur, as well as some penetration to the discharge space 9 from whence it will be delivered to the intake of the engine. However, in accordance with the invention the space e which communicates between the gap g and the gaps a, 1a, b and c is vented to the atmosphere by means of through bores 10 in the passage member 4a and through a passage 11 defined in the casing 4 which connects through a check valve 12 to the atmosphere. The check valve 12 provides for inflow of air whenever the pressure within the space e reaches a negative value.

In order to ensure sealing between the gap g and the space 9 and the parts which require lubrication, piston rings 8a and 8b are provided between the oil passage member 4a and the bushing 6 which ride in respective annular grooves 6a and 6b of the bushing 6. This seal also prevents penetration of dirt into the bearing areas. By means of passage 10 and 11 the gap e and connecting gap g are vented to atmosphere to negate the vacuum which may be present within the surrounding area, due to the action of the impeller 2. Oil passage member 4a is also sealed radially outwardly with the casing 4 by means of sealing ring 15.

Whenever subatmospheric pressure occurs in the diffuser 9 which would tend to cause a suction on the bearing areas a, b and c via the gap g between the wheel hub and the oil passage member 4a, the suction is decreased by the inventive construction of the equalizing bores 10 and 11 so that there will be no tendency to draw off the lubricant to the discharge of the supercharger.

In the indicated embodiment, the pressure equalizing bores 10 and 11 are closed off in the reverse flow direction by means of the return valve 12. In this manner, and upon reverse pressure differential the flow of the oil veil or fog into the free atmosphere is prevented.

While specific embodiments of the invention have been shown and described in detail to illustrate the application of the inventive principles, it will be understood that the invention may be embodied otherwise without departing from such principles.

What is claimed is:

1. In a turbine supercharger comprising a casing defining an axial inlet and a radial discharge, a shaft rotatably mounted in said casing, an impeller secured to said shaft for rotation therewith and arranged to draw fluid in axially and discharge it into the radial discharge, a bearing supporting said shaft and forming a first lubricating gap with said shaft, means adjacent said bearing for preventing axial displacement of said shaft and forming a second lubricating gap with said shaft and said bearing, and means for delivering said lubricant to said first and second gaps, the improvement comprising means for preventing the suction of lubricant from the bearing parts when subatmospheric pressures in the discharge are encountered including a passage member disposed between said impeller and said bearing in sealing engagement with said casing, means sealing said passage member with respect to said shaft at the end adjacent said impeller, labyrinth seal means sealing the opposite end of said passage member with respect to said shaft, and a pressure equalizing bore defined in said casing and said passage member communicating the interior of said casing adjacent said bearing with atmosphere when negative pressures are encountered adjacent the discharge of said supercharger.

2. A turbine supercharger comprising a casing, a shaft having a small diameter portion and a large diameter portion, a bearing in said casing rotatably supporting said large diameter portion, means for supplying oil centrally to said bearing, said bearing defining with said shaft a first oil gap, an impeller affixed to said shaft for rotation therewith, a bushing secured to said shaft and extending between said impeller and said bearing, a spur disc member disposed between said bushing and said bearing, said spur disc member having a portion extending axially toward said impeller and defining radial centrifuging oil passages therein, and a passage member in said casing between said impeller and said spur disc member and located around said bushing, a first and second sealing ring sealing said oil passage member at each end with said bushing, said oil passage member having a passage defined therethrough in communication with the gap formed between said oil passage member and said bushing, and passage means connected with the passage in said oil passage member for communicating said passage to atmosphere when there is a vacuum in said discharge of said turbine supercharger tending to draw away the lubrication from said first gap.

3. In a turbine supercharger comprising a casing defining an axial inlet and a radial discharge, a shaft rotatably mounted in said casing, an impeller secured to said shaft for rotation therewith and arranged to draw fluid in axially and discharge it into the radial discharge, a bearing supporting said shaft and forming a first lubricating gap with said shaft, means adjacent said bearing for preventing axial displacement of said shaft and forming a second lubricating gap with said shaft, means adjacent said bearing for preventing axial displacement of said shaft and forming a second lubricating gap with said shaft and said bearing, and means for delivering said lubricant to said first and second gaps, the improvement comprising a passage member disposed between said impeller and said bearing in sealing engagement with said casing, means sealing at least one end of said passage member to said shaft with respect to said shaft at the end adjacent said impeller, a passage defined in said casing and said passage member communicating with the interior of said casing adjacent said bearing with atmosphere when negative pressures are encountered adjacent the discharge of said supercharger, said means adjacent said bearing for preventing axial displacement including a spur disc member abutting said bearing, said spur disc member including an axial extension, said oil passage member including an axial extension aligned within the axial extension of the spur disc member to define a labyrinth seal therewith, and passage means defined in said spur disc member extending from the space between said spur disc member and said passage member sleeve extension for centrifuging oil radially outwardly into said casing.

4. In a turbine supercharger comprising a casing defining an axial inlet and a radial discharge, a shaft rotatably mounted in said casing, an impeller secured to said shaft for rotation therewith and arranged to draw fluid in axially and discharge it into the radial discharge, a bearing supporting said shaft and forming a first lubricating gap with said shaft, means adjacent said bearing for preventing axial displacement of said shaft and forming a second lubricating gap with said shaft and said bearing, and means for delivering said lubricant to said first and second gaps, the improvement comprising a passage member disposed between said impeller and said bearing in sealing engagement with said casing, means sealing at least one end of said passage member to said shaft with respect to said shaft at the end adjacent said impeller, a passage defined in said casing and said passage member communicating with the interior of said casing adjacent said bearing with atmosphere when negative pressures are encountered adjacent the discharge of said supercharger, said means adjacent said bearing for preventing axial displacement including a spur disc member having a disc portion abutting against said bearing and including a passage-forming portion extending axially in a direction toward said impeller, a plurality of radial passages defined in said passage-forming portion, a bushing secured to said shaft spaced inwardly from said oil passage member to define a gap therewith, said passage member including a sleeve extension underlying the passage-forming portion of said spur disc member, oil conduit means for delivering oil centrally to said bearing and between said spur disc and said passage member, sealing rings disposed between said bushing and said oil passage member at axially spaced locations to close off the gaps formed between said oil passage member and said bushing, and a passage defined through said oil passage member, a passage in said casing in communication with the passage of said oil passage member, and check valve means permitting communication with the passage in said casing and the passage in said oil passage member for connecting the passage to atmosphere when negative pressures exist for equalizing such pressure.

References Cited by the Examiner
UNITED STATES PATENTS 2,684,196  7/54  Wood _____ 230—207
2,775,400  12/56 Cox _____ 230—207

ROBERT M. WALKER, *Primary Examiner.*

LAURENCE V. EFNER, *Examiner.*